(12) United States Patent
Velayudhapillai et al.

(10) Patent No.: US 9,356,908 B2
(45) Date of Patent: May 31, 2016

(54) METHOD AND SYSTEM FOR CAUSING A CLIENT DEVICE TO RENEW A DYNAMIC IP ADDRESS

(71) Applicant: Aruba Networks, Inc., Sunnyvale, CA (US)

(72) Inventors: Krishnapillai Velayudhapillai, Cupertino, CA (US); Pradeep Iyer, Cupertino, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 347 days.

(21) Appl. No.: 13/719,674

(22) Filed: Dec. 19, 2012

(65) Prior Publication Data

US 2014/0173124 A1   Jun. 19, 2014

(51) Int. Cl.
*G06F 15/16* (2006.01)
*H04L 29/12* (2006.01)
*H04W 8/26* (2009.01)
*H04L 29/14* (2006.01)
*H04W 76/02* (2009.01)

(52) U.S. Cl.
CPC ........ *H04L 61/2015* (2013.01); *H04L 61/2046* (2013.01); *H04L 61/6068* (2013.01); *H04L 69/40* (2013.01); *H04W 8/26* (2013.01); *H04W 76/02* (2013.01)

(58) Field of Classification Search
CPC ............ H04L 61/2015; H04L 61/2048; H04L 61/6068
USPC ......... 709/217, 219, 223, 224, 225, 227, 228, 709/250
See application file for complete search history.

(56) References Cited

U.S. PATENT DOCUMENTS

| | | | |
|---|---|---|---|
| 8,072,973 B1 * | 12/2011 | Kotha et al. | 370/389 |
| 2007/0230477 A1 * | 10/2007 | Worley | 370/395.3 |
| 2008/0281973 A1 * | 11/2008 | Yang | 709/228 |
| 2009/0230477 A1 * | 9/2009 | Huang et al. | 257/363 |

* cited by examiner

*Primary Examiner* — Viet Vu
(74) *Attorney, Agent, or Firm* — Mannava & Kang, P.C.

(57) ABSTRACT

A method includes terminating a connection between (a) a wireless network supported by a network device and (b) a client device. The method further includes rejecting one or more requests to establish the connection between the wireless network and the client device based at least on the one or more requests being received from the client device within a first period of time subsequent to the terminating operation and accepting a particular request to establish the connection between the wireless network and the client device based at least on the particular request being received from the client device after the first period of time subsequent to the terminating operation.

19 Claims, 3 Drawing Sheets

METHOD AND SYSTEM FOR CAUSING A CLIENT DEVICE TO RENEW A DYNAMIC IP ADDRESS

TECHNICAL FIELD

The present disclosure relates to dynamic Internet Protocol (IP) addresses. In particular, the present disclosure relates to causing a client device to renew a dynamic IP address by temporarily disabling a connection with the client device.

BACKGROUND

In recent years, Wireless Local Area Network (WLAN) technologies have emerged as a fast-growing market. Among the various WLAN technologies, Institute of Electrical and Electronics Engineers (IEEE) 802.11 standard is the dominating technology and is frequently used for WLANs.

Client devices within WLANs communicate with network devices such as access points to obtain access to one or more network resources. Access points are digital devices that may be communicatively coupled to one or more networks (e.g., Internet, an intranet, etc.). Access points may be directly connected to the one or more networks or connected via a controller. An access point, as referred to herein, may include a wireless access point (WAP) that communicates wirelessly with devices using Wi-Fi, Bluetooth or related standards and that communicates with a wired network.

Errors may result when a client device that is communicatively coupled to a first access point on a first IP subnet connects with a second access point on a different second IP subnet without renewing the dynamic IP address. The dynamic IP address being associated with the first IP subnet and being assigned to the client device when the client device was on the first IP subnet. In one example, this error may occur when different access points on different IP subnets advertise the same Basic Service Set Identification (BSSID). A client device switches connection from a particular network supported by one access point to another network with the same name but supported by another access point. The client device fails to determine that the new network is supported by a new access point on a different IP subnet which may require that the client device obtain a new IP address corresponding to the different IP subnet.

In another example, errors may result when multiple client devices on the same IP subnet attempt to use the same IP address.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

General Overview

In one or more embodiments, a client device, with an IP address corresponding to a first IP subnet, connects to wireless network corresponding to a different second IP subnet. At least one network device on the second IP subnet terminates the connection with the client device and furthermore rejects connection requests, from the client device, which are received within a first period of time after the termination. The at least one network device (or other network device on the second IP subnet) accepts a connection request, from the client device, which is received subsequent to the first time period elapsing. As a result of the client device being unable to connect a network device during the first time period, the client device deletes a previously used dynamic IP address and subsequent to successfully connecting, requests a new IP address via a network device on the second IP subnet.

In one or more embodiments, a network device determines that multiple client devices on a same IP subnet are associated with a same dynamic IP address. In response to determining that multiple client devices are associated with the same dynamic IP address, one or more network devices on the IP subnet force one or more of the client devices to obtain a new dynamic IP address.

Architechtural Overview

Figure 1:
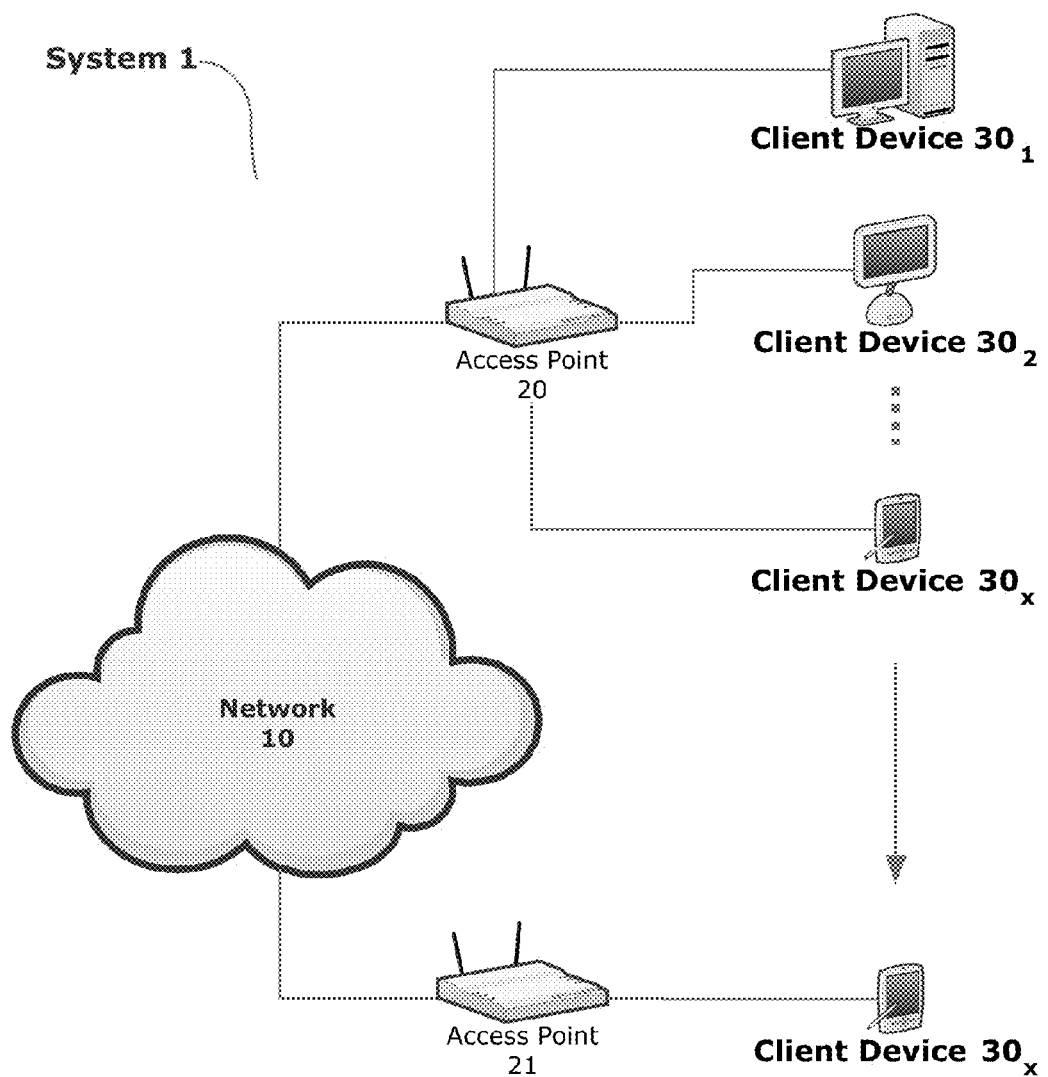
FIG. 1 shows a block diagram example of a system in accordance with one or more embodiments.

FIG. 1 shows a block diagram example of a system which includes digital devices in accordance with one or more embodiments. In one or more embodiments, System 1 may include more or less digital devices, than the devices illustrated in FIG. 1.

The term "digital device" generally refers to any hardware device that includes a processor. When the digital device is adapted for communications with a network, the digital device may be configured as a network device, a client device, or both. A digital device may refer to a physical controller device or a hardware device executing a virtual controller.

In an embodiment, a "network device" is a digital device that is configured to provide a network service. A "client device" is a digital device that is configured to receive a network service. Examples of digital devices include a computer, a tablet, a laptop, a desktop, a netbook, a server, a web server, authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a printer, a mobile handset, a smartphone, a personal digital assistant "PDA", a wireless receiver and/or transmitter, an access point, a base station, a communication management device, a router, a switch, and/or a controller.

System 1, as illustrated in FIG. 1, is a system that includes a network 10 (for example, a Local Area Network, a Wide Area Network, the Internet, Intranet, etc.), an access point 20, an access point 21, and a set of client devices $30_1$-$30_x$.

In one or more embodiments, access point 20 and access point 21 each correspond to a network device such as a wired access port, a wireless access port, a switch, a router, a cellular phone configured as a hot spot, or any combination thereof. Access point 20 and access point 21 are examples of network devices that used for purposes of clarity, however, embodiments are applicable to any network device configured to provide a network service (for example, connecting a client device to a network resource). An access point communicatively couples a client device to one or more other devices and/or resources within System 1. The access point 20 and access point 21 are configured to forward data to or from the client devices $30_1$-$30_x$.

Access point 20 and access point 21 are communicatively coupled to the network 10 via a transmission medium to send and receive data. The transmission medium may include wired and/or wireless segments. Access point 20 and access point 21 may be on a same network or different networks. In one example, access point 20 and access point 21 are on different IP subnets where each IP subnet is associated with a set of IP addresses assigned to devices on that IP subnet.

In an example, System 1 may include one or more controllers (not shown) which are configured to communicate with one or more access points (for example, access point 20 and access point 21) within System 1. The controller links one or both access point 20 and access point 21 to network 10. Alternatively, two separate controllers link access point 20 and access point 21 to network 10.

In an embodiment, the client devices $30_1$-$30_x$ are digital devices that include a processor, memory, and input/output (I/O) interfaces including a wireless interface such as an IEEE 802.11 wireless interface. In an example, the client devices $30_1$-$30_n$ are capable of receiving data streams using the wireless interface. Examples of client devices include personal computers, laptop computers, netbook computers, wireless music players, portable telephone communications devices, smart phones, tablets, and digital televisions. The wireless interface may be used to communicate with the access point 20 to obtain access to devices and/or resources within System 1.

Access Points

Figure 2:
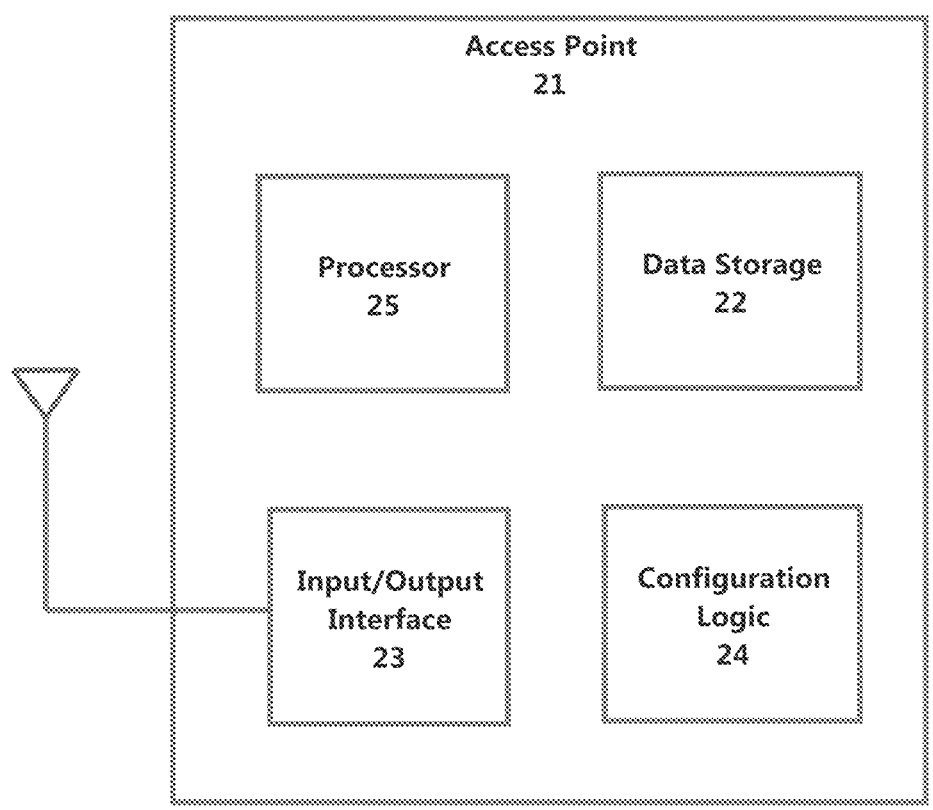
FIG. 2 shows a block diagram example of an access point in accordance with one or more embodiments.

FIG. 2 shows a block diagram example of access point 21 in accordance with one or more embodiments. One or more operations described herein as being performed by an access point, may be performed by another network device such as a controller. Furthermore, one or more components described herein as being implemented within an access point may be implemented within another network device such as a controller. Other access points within System 1 may be configured similarly or differently than access point 20. Access point 21 is a network device that comprises one or more of: data storage 22, an I/O interface 23, a device configuration logic 24, and at least one processor 25.

The data storage 22 of the access point 21 comprises volatile and/or non-volatile memory. For instance, the data storage 22 may include a fast read-write memory for storing programs and data during the access point 21's operations and a hierarchy of persistent memory such as ROM, EPROM, and Flash memory for storing instructions and data needed for the startup and/or operations of access point 21. The data storage 22 stores data that is to be transmitted from the access point 21 or data that is received by access point 21. In an embodiment, the data storage 22 is a distributed set of data storage components.

In an embodiment, the I/O interface 23 corresponds to one or more components used for communicating with other devices via wired or wireless segments. The I/O interface 23 may include a wired network interface such as an IEEE 802.3 Ethernet interface and/or a wireless interface such as an IEEE 802.11 WiFi interface.

The processor 25 is coupled to the data storage 22 and the I/O interface 23. The processor 25 may be any processing device including, but not limited to a MIPS-class processor, a microprocessor, a digital signal processor, an application specific integrated circuit, a microcontroller, a state machine, or any type of programmable logic array.

In an embodiment, the device configuration logic 24 includes one or more functional units implemented using firmware, hardware, software, or a combination thereof for communicating, connecting, or dis-connecting with client devices as described below with reference to FIG. 3. Although, the device configuration logic 24 is shown as implemented on access point 21, one or more physical or functional components of the device configuration logic 24 may be implemented on a separate device. The individual functional components of the device configuration logic 24 are described below with Reference to FIG. 3.

Temporarily Disabling a Connection with a Client Device

Figure 3:
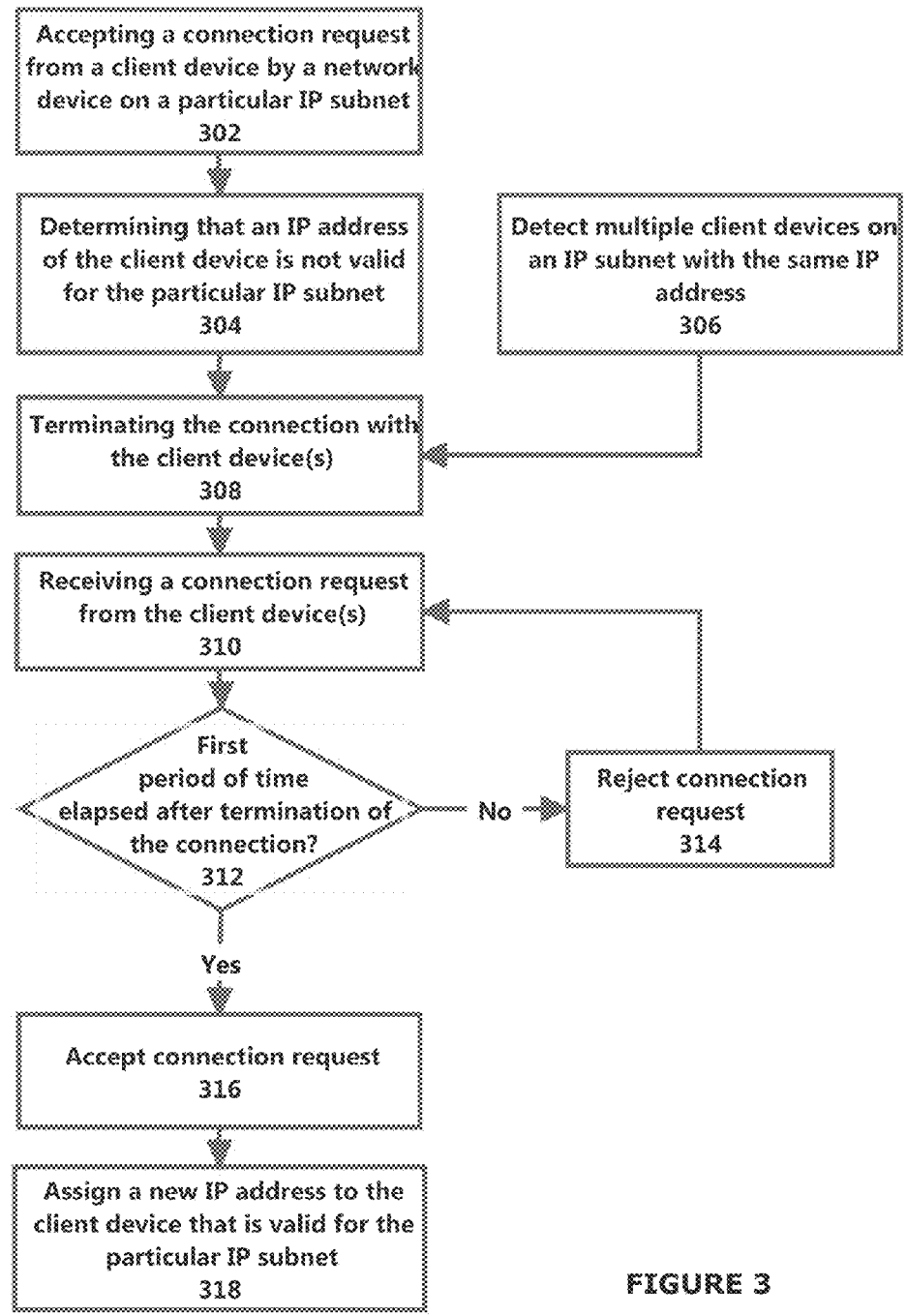
FIG. 3 illustrates an example method for causing a client device to renew a dynamic IP address by temporarily disabling a connection with the client device.

FIG. 3 illustrates an example method for temporarily disabling a connection with a client device. One or more operations illustrated in FIG. 3 may be modified, rearranged, or omitted all together. Accordingly, the particular sequence of operations illustrated in FIG. 4 should not be construed as limiting the scope of one or more embodiments.

Initially, a connection request from a client device is accepted by a network device on a particular IP subnet in accordance with an embodiment (Operation 302). Accepting a connection request, as referred to herein, may include accepting any request involved in establishing a connection between the client device and the network device prior to the client device transmitting data to a network via the network device. In one example, accepting a connection request may include transmitting a probe response after receiving a probe request from the client device, accepting an association request received from the client device, and authenticating the client device by submitting credentials received from the client device to an authentication server (e.g., RADIUS server).

In an embodiment, subsequent to a network device, on a particular IP subnet, accepting a connection request from a client device, a determination is made that an IP address of the client device is not valid (i.e., invalid) for the particular IP subnet (Operation 304). In one example, determining that the IP address of the client device is invalid for the particular IP subnet includes comparing the IP address of the client device (e.g., 140.13.<u>10</u>.2) with a range of IP addresses valid for the particular IP subnet (e.g., 140.13.<u>11</u>.0 to 140.13.<u>11</u>.255). If the IP address of the client device is not one of the IP addresses in the range of valid IP addresses for the particular IP subnet, then the IP address is not valid for the particular IP subnet. The comparison may be performed by comparing the first three prefixes of the IP address of the client device (e.g., 140.13.10) with the first three prefixes of the IP addresses corresponding to the IP subnet (e.g., 140.13.11) to determine if the IP address of the client device is valid.

In one example, an employee Krishna has a laptop that is connected to a first Wireless Local Area Network (WLAN) identified by the ESSID "ethersphere" and supported by a first access point on a first IP subnet in a first corporate building Aruba44. Data transmitted by the laptop is received by the first access point and then forwarded along a wired network to ultimately reach a destination address identified in the data. Furthermore, data addressed to the laptop is received by the first access point and forwarded by the first access point to the laptop. Thereafter, while using the laptop, Krishna leaves the first corporate building Aruba44 and enters a second corporate building Aruba21. When Krishna leaves the first corporate building Aruba44, the laptop loses the connection with the WLAN identified by the ESSID "ethersphere". Upon Krishna entering corporate building Aruba 21, the laptop detects a different second WLAN, on a different second IP subnet, that is also identified by the ESSID "ethersphere". The laptop associates with the WLAN identified by the ESSID "ethersphere" without renewing the IP address that was used in corporate building Aruba21. The laptop may connect with the WLAN identified by the ESSID "ethersphere" on the second IP subnet without requesting a new IP address based on an incorrect determination that the "ethersphere" WLAN (on the second IP subnet) is the same as the previous "ethersphere" WLAN on the first IP subnet. Since the laptop's IP address is valid for the first IP subnet and the laptop incorrectly determines that the laptop is on the first IP subnet, the laptop does not request a new IP address. As a result, the laptop, while on the second IP subnet, has an IP address which corresponds to the first IP subnet and that is invalid on the second IP subnet. The second access point then determines that the IP address of the laptop is invalid for the second IP subnet and in response to determining that the IP address of the laptop is not valid for the second IP subnet, performs operations 308-318 as described below.

In an embodiment, the connection with the client device that was accepted in Operation 302 is terminated (Operation 308). Terminating the connection with the client device includes performing one or more steps that results in disabling the client device from communicating with a network via the network device. Terminating the connection with the client device may include transmitting a de-association request or a de-authentication request.

Subsequent to termination of the connection, connection requests are received from the client device by one or more network devices on the particular IP subnet (Operation 310). The connection requests may be rejected (Operation 314) if the connection requests are received within a first period of time after the termination of the connection. Rejecting connection requests, as referred to herein, includes transmitting rejections or failing to respond to connection requests (for example, probe requests).

Once the first period of time after the terminating operation has elapsed, a connection request from the client device is accepted by a network device on the particular IP subnet (Operation 316). Operations 314 and 316 may be performed by a set of network devices on the particular IP subnet so that the client device is unable to connect to any network device on the particular IP subnet. Once a connection request is accepted from the client device, a Dynamic Host Configuration Protocol (DHCP) request is received from the client device to obtain a new IP address. A new IP address that is valid on the particular IP subnet is then assigned to the client device (Operation 318).

Continuing the example above to illustrate operations 308-316, the second access point terminates the connection with Krishna's laptop. Furthermore, the second access point and other access points (located in corporate building Aruba21) on the second IP subnet reject connection requests received from Krishna's laptop in response to determining that the connection requests are received within a first time period after termination of connection with Krishna's laptop. As a result of not being able to find a wireless network for the first time period (e.g., x seconds configured by a system administrator), Krishna's laptop deletes the IP address corresponding to the first IP subnet. Deleting the IP address may include, but is not limited to, marking the IP address as invalid, deleting pointers to the IP address, or overwriting the IP address. Krishna's laptop continues to attempt to connect to a network device in corporate building Aruba21 and a request for connection is accepted after the first time period, following the terminating operation, has elapsed. Specifically, the second access point (or another access point in corporate building Aruba 21) accepts a connection request received from the laptop in response to determining that the first time period, following the terminating operation, has elapsed. Since, Krishna's laptop has deleted the previous IP address, Krishna's laptop requests a new IP address via a Dynamic Host Configuration Protocol (DHCP) request. The second access point forwards the DHCP request to a DHCP server. The DHCP server assigns a new IP address to Krishna's laptop from a list of available IP addresses that are valid for the second IP subnet. The second access point transmits the new IP address to Krishna's laptop.

In an embodiment, Operations 308-318 may be performed in response to detecting multiple client devices on a particular IP subnet with the same IP address (Operation 306). In an example, a first client device with IP address x may enter a sleep mode and stop communicating with access points on the particular IP subnet. Due to a lack of response from the first client device, a determination may be made by network devices on the particular IP subnet that the first client device is no longer on the particular IP subnet and that the IP address x is available for assignment. The IP address x may then be assigned by a DHCP server to a second client device. When the first client device awakes from sleep mode and communicates with network devices on the particular IP subnet, the first client device may continue the use of IP address x resulting in both the first client and the second client device using the IP address x. Operations 308 to 318 may be performed on one or both (or more) client devices to ensure that IP address x is not concurrently used by multiple client devices. In an embodiment, instructions may be transmitted to a client device to renew an IP address used by the client device. For example, a DHCP FORCE RENEW packet may be transmitted to a client device to force a client device to renew an IP address.

In an embodiment, a client device is caused to renew an IP address in response to determining that the IP address for the client device is no longer needed. In an example, a client device uses a first IP address associated a particular IP subnet to communicate with devices on the particular IP subnet via an encapsulation tunnel. The client device may be receiving multicast streams, encrypted communications, or other services via the encapsulation tunnel. However, once the subscription to these services has terminated or these services are available on the new IP subnet for the client device, the encapsulation tunnel and the first IP address is no longer necessary. In an embodiment, the client device is caused to renew the IP address in response to determining one or more of: subscription of network services associated with a previous IP subnet is terminated, the network services are available on the new IP subnet for the client device, or an encapsulation tunnel to an old IP subnet has been terminated. Operations 308-318 may be executed to cause the client device to obtain a new IP address.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

According to embodiments of the present disclosure, network services provided by a network device, solely or in combination with other network devices, include, but are not limited to, an Institute of Electrical and Electronics Engineers (IEEE) 802.1x authentication to an internal and/or external Remote Authentication Dial-In User Service (RADIUS) server; an MAC authentication to an internal and/or external RADIUS server; a built-in Dynamic Host Configuration Protocol (DHCP) service to assign wireless client devices IP addresses; an internal secured management interface; Layer-3 forwarding; Network Address Translation (NAT) service between the wireless network and a wired network coupled to the network device; an internal and/or external captive portal; and an external management system for managing the network devices in the wireless network.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Embodiments are directed to methods for performing operations described herein. Embodiments are directed to devices configured to perform operations described herein.

As used herein, "digital device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards. An AP may refer to any device (for example, a cellular telephone) that is configured as a hot spot and may connect one or more client devices to a network.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions which, when executed by one or more hardware processors, causes performance of operations comprising:

terminating, by a network device, a connection between a wireless network supported by the network device and a client device, wherein terminating the connection comprises determining, by the network device, whether multiple client devices, including the client device, have a same (Internet Protocol) IP address, and in response to determining the multiple client devices have the same IP address, terminating the connection and transmitting instructions to the client device to renew an IP address used by the client device;

rejecting one or more requests to establish the connection between the wireless network and the client device based at least on the one or more requests being received from the client device during a first period of time subsequent to the terminating operation;

accepting a particular request to establish the connection between the wireless network and the client device based at least on the particular request being received from the client device after the first period of time, subsequent to the terminating operation, has elapsed.

2. The computer readable medium of claim 1, wherein the network device is an access point.

3. The computer readable medium of claim 1,
wherein terminating the connection comprises determining whether an IP address assigned to the client device is not valid on an IP subnet comprising the network device, and terminating the connection in response to determining the IP address is not valid on the IP subnet.

4. The computer readable medium of claim 1, wherein the operations further comprise:
configuring each network device, of a plurality of network devices, to reject requests received from the client device during a first period of time subsequent to the terminating operation.

5. The computer readable medium of claim 1, wherein the client device was connected to a second wireless network prior to connecting with said wireless network, wherein terminating the connection comprises determining whether a tunnel from the client device to at least one device on the second wireless network is to be terminated, and terminating the connection in response to determining the tunnel is to be terminated.

6. The computer readable medium of claim 1, wherein the operations further comprise receiving a request from the client device for a new IP address subsequent to accepting the first request to establish the connection.

7. A non-transitory computer readable medium implemented on one or more devices and comprising instructions which, when executed by one or more hardware processors, causes performance of operations comprising:
accepting, by a network device, a request from a client device to establish a connection between a wireless network supported by the network device and the client device, wherein prior to the client device transmitting the request to the network device, the client device was previously connected to the wireless network on a first subnet using a first IP address for the first subnet, and the network device accepts the request without renewing the IP address;
determining, by the network device, that the first IP address of the client device is invalid on a second subnet associated with the network device;
responsive to the determining by the network device that the first IP address of the client device is invalid on the second subnet, causing, by the network device, the client device to obtain a new IP address.

8. The computer readable medium of claim 7, wherein determining that the first IP address of the client device is invalid comprises determining that a source IP address in a message received from the client device is invalid on the second IP subnet associated with the network device.

9. The computer readable medium of claim 7, wherein the network device causing the client device to obtain a new IP address comprises transmitting, by the network device, instructions to the client device to obtain the new IP address.

10. The computer readable medium of claim 7, wherein the network device causing the client device to obtain a new IP address comprises transmitting, by the network device, a DHCP FORCE RENEW packet to the client device.

11. The computer readable medium of claim 7, wherein the network device causing the client device to obtain a new IP address comprises:
terminating the connection between the wireless network and client device;
rejecting one or more requests to establish the connection between the wireless network and the client device based at least on the one or more requests being received from the client device during a first period of time subsequent to the terminating operation;
accepting a particular request to establish the connection between the wireless network and the client device based at least on the particular request being received from the client device after the first period of time subsequent to the terminating operation has elapsed.

12. The computer readable medium of claim 11, wherein the network device causing the client device to obtain a new IP address further comprises:
configuring each network device, of a plurality of network devices, to reject requests received from the client device during the first period of time subsequent to the terminating operation.

13. The computer readable medium of claim 11, wherein the network device is an access point.

14. A method comprising:
terminating a connection between a wireless network supported by a network device comprising a hardware processor and a client device, wherein terminating the connection comprises determining, by the network device, whether multiple client devices, including the client device, have a same (Internet Protocol) IP address, and in response to determining the multiple client devices have the same IP address, terminating the connection and transmitting instructions to the client device to renew an IP address used by the client device;
rejecting one or more requests to establish the connection between the wireless network and the client device based at least on the one or more requests being received from the client device during a first period of time subsequent to the terminating operation;
accepting a particular request to establish the connection between the wireless network and the client device based at least on the particular request being received from the client device after the first period of time, subsequent to the terminating operation, has elapsed.

15. The method of claim 14, wherein the network device is an access point.

16. The method of claim 14, further comprising:
wherein terminating the connection comprises determining whether an IP address assigned to the client device is not valid on an IP subnet comprising the network device, and terminating the connection in response to determining the IP address is not valid on the IP subnet.

17. The method of claim 14, wherein the operations further comprise:
  configuring each network device, of a plurality of network devices, to reject requests received from the client device during a first period of time subsequent to the terminating operation.

18. The method of claim 14, wherein the client device was connected to a second wireless network prior to connecting with said wireless network, wherein terminating the connection comprises determining whether a tunnel from the client device to at least one device on the second wireless network is to be terminated, and terminating the connection in response to determining the tunnel is to be terminated.

19. The method of claim 14, wherein the operations further comprise receiving a request from the client device for a new IP address subsequent to accepting the first request to establish the connection.

* * * * *